(12) United States Patent
Staller et al.

(10) Patent No.: US 6,838,143 B2
(45) Date of Patent: Jan. 4, 2005

(54) PEELABLE PROTECTIVE FILM

(75) Inventors: Christelle Staller, Seltz (FR);
Karl-Heinz Schumacher, Neustadt (DE); Oliver Hartz, Mannheim (DE); Harald Röckel, Neustadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 183 days.

(21) Appl. No.: 09/799,620

(22) Filed: Mar. 7, 2001

(65) Prior Publication Data

US 2001/0041238 A1 Nov. 15, 2001

(30) Foreign Application Priority Data

Mar. 7, 2000 (DE) .......................................... 100 10 983

(51) Int. Cl.$^7$ .......................... B32B 27/30; B32B 27/32
(52) U.S. Cl. ................ 428/41.5; 156/330.9; 156/331.8; 428/355 CN; 428/355 AC; 428/520; 526/288; 526/302; 526/317.1; 526/319
(58) Field of Search .......................... 156/330.9, 331.8; 428/41.5, 355 CN, 355 AC, 520; 526/288, 302, 317.1, 319

(56) References Cited

U.S. PATENT DOCUMENTS

| | | | | |
|---|---|---|---|---|
| 4,035,546 A | * | 7/1977 | Ruppert, Jr. ................ 428/332 |
| 4,713,273 A | * | 12/1987 | Freedman .................. 428/41.8 |
| 5,055,504 A | | 10/1991 | Mahil et al. .................. 524/48 |
| 5,908,908 A | | 6/1999 | Vanhoye et al. ......... 526/318.4 |

FOREIGN PATENT DOCUMENTS

| EP | 0 417 564 | 3/1991 |
|---|---|---|
| EP | 0 822 206 | 2/1998 |

* cited by examiner

Primary Examiner—D. S. Nakarani
(74) Attorney, Agent, or Firm—Oblon, Spivak, McClelland, Maier & Neustadt, P.C.

(57) ABSTRACT

Adhesive-coated, peelable protective films and peelable labels, wherein the adhesive contains a copolymer that is capable of undergoing free-radical polymerization and which comprises, to an extent of from 0.1 to 10 wt %, based on the copolymer, a compound A compound of at least one copolymerizable, ethylenically unsaturated group and a group of the formula (I)

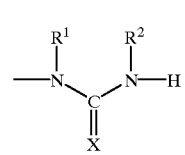

in which $R^1$ and $R^2$ independently stand for hydrogen or a $C_1$–$C_5$ alkyl group or $R^1$ and $R^2$ together form a bridging $C_2$–$C_4$ alkylene group which can be mono- or di-substituted by a $C_1$–$C_4$ alkoxy group or hydroxyl group and X stands for O or S.

10 Claims, No Drawings

PEELABLE PROTECTIVE FILM

The invention relates to an adhesive-coated, peelable protective film or peelable labels, wherein the adhesive substance contains a copolymer that is capable of undergoing free-radical polymerization and which comprises, to an extent of from 0.1 to 10 wt %, based on the copolymer, a compound A having at least one copolymerizable, ethylenically unsaturated group and a group of formula I

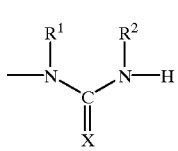

(I)

in which $R^1$ and $R^2$ independently stand for a hydrogen or a $C_1$–$C_5$ alkyl group or $R^1$ and $R^2$ together stand for a bridging $C_2$–$C_4$ alkylene group, which can be mono- or di-substituted by a $C_1$–$C_4$ alkoxy group or hydroxyl group, and X stands for O or S.

The use of aqueous polymer dispersions as adhesive substances or crude adhesives for peelable protective films or labels is known. A drawback of the protective films or labels coated with these adhesives is that, following peeling, residues of the adhesive often remain on the substrate. To reduce the residues left after peeling, crosslinking agents, eg polyurethanes, are often added to the aqueous polymer dispersions. That requires an additional mixing operation during manufacture.

Self-adhesives based on emulsion polymers containing ethyleneurea groups are described in EP-A 822,206.

Thus the present invention relates to protective films and labels leaving no residues when peeled. However, the protective films and labels should nevertheless stick well to the substrate. Furthermore, the adhesive layer should adhere well to the film or label, and should also be transparent and resistant to ageing and light.

Accordingly we have found the protective films and labels defined above.

The protective films and labels of the invention are coated with an adhesive.

The adhesive contains a copolymer obtained by free-radical polymerization and comprising, to an extent of from 0.1 to 10 wt %, preferably
from 0.5 to 8 wt % and more preferably
from 1 to 5 wt %, based on the copolymer,
a compound A having at least one group of the above formula I.

Preferably $R^1$ and $R^2$ stand independently for hydrogen or a $C_1$–$C_5$ alkyl group or $R^1$ and $R^2$ together stand for a bridging $C_2$–$C_4$ alkylene group. X preferably stands for O.

In a particularly preferred embodiment, $R^1$ and $R^2$ together stand for a $C_2$–$C_4$ alkylene group, particularly an ethylene group, connecting the two nitrogens.

The copolymerizable, ethylenically unsaturated group in compound A is preferably a (meth)acrylic group.

Compound A preferably contains a copolymerizable, ethylenically unsaturated group and a group of formula I.

Compound A is preferably a compound of the formula

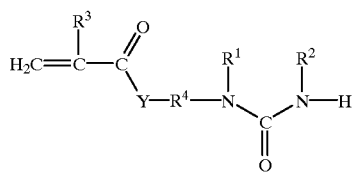

(II)

in which $R^3$ stands for a hydrogen atom or a methyl group, Y for —O— or —NH—, $R^4$ for a divalent $C_1$–$C_{10}$ alkylene group and $R^1$ and $R^2$ have the meanings stated above.

Preferably $R^3$ stands for a methyl group, X for —O—, $R^4$ for a $C_2$–$C_6$ alkylene group and $R^1$ and $R^2$ together stand for a $C_2$–$C_4$ alkylene group.

Particularly preferred compounds A are (1-(2-methacrylogloxyethyl) imidazolinone-2, known as ureidoethylene methacrylate ($R^1$, $R^2$=ethylene; X=O; $R^3$=methyl, abbreviation UMA):

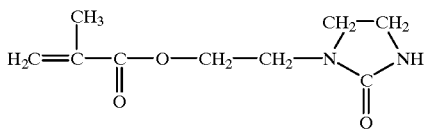

or ureidoethylene acrylate.

The copolymer is composed of compounds that are capable of undergoing free-radical polymerization (monomers).

Preferably the copolymer comprises so-called main monomers to an extent of at least 40 wt % and more preferably at least 60 wt % and most preferably at least 80 wt %.

The main monomers are selected from $C_1$–$C_{20}$ alkyl (meth) acrylates, vinyl esters of carboxylic acids containing up to 20 carbon atoms, vinyl aromatic compounds containing up to 20 carbon atoms, ethylenically unsaturated nitriles, vinyl halides, vinyl ethers of alcohols containing from 1 to 10 carbon atoms, aliphatic hydrocarbons containing from 2 to 8 carbons and 1 or 2 double bonds, or mixtures of these monomers.

Examples thereof are alkyl (meth)acrylates containing a $C_1$–$C_{10}$ alkyl group, such as methyl methacrylate, methyl acrylate, n-butyl acrylate, ethyl acrylate and 2-ethylhexyl acrylate.

In particular, mixtures of alkyl (meth)acrylates are suitable.

Vinyl esters of carboxylic acids containing from 1 to 20 carbons are eg vinyl laurate, vinyl stearate, vinyl propionate, vinyl esters of Versatic acid and vinyl acetate.

Suitable vinylaromatic compounds are vinyl toluene, α- and π-methylstyrenes, α-butylstyrene, 4-n-butylstyrene, 4-n-decylstyrene and preferably styrene. Examples of nitrites are acrylonitrile and methacrylonitrile.

The vinyl halides are ethylenically unsaturated compounds that are substituted by chlorine, fluorine or bromine, preferably vinyl chloride and vinylidene chloride.

Vinyl ethers which may be mentioned are eq vinyl methyl ether or vinyl isobutyl ether. Vinyl ethers of alcohols containing from 1 to 4 carbons are preferred.

As examples of hydrocarbons containing from 2 to 8 carbons and two olefinic double bonds there may be mentioned butadiene, isoprene and chloroprene.

Preference is given to main monomers comprising $C_1$–$C_{10}$ alkyl (meth)acrylates, particularly $C_1$–$C_8$ alkyl (meth)acrylates, of which the acrylates are particularly preferred.

Very special preference is given to methyl acrylate, ethyl acrylate, n-butyl acrylate, n-hexyl acrylate, octyl acrylate and 2-ethylhexyl acrylate and also mixtures of these monomers.

In addition to the main monomers the polymer can contain further monomers, eg monomers containing carboxylic, sulfonic or phosphonic acid groups. Preference is given to carboxylic acid groups. As examples thereof there may be mentioned acrylic acid, methacrylic acid, itaconic acid, maleic acid or fumaric acid.

Further monomers also include eg monomers containing hydroxyl groups, particularly $C_1$–$C_{10}$ hydroxyalkyl (meth) acrylates and (meth)acrylamide.

As examples of further monomers there may be mentioned phenyloxyethyl glycol mono(meth)acrylate, glycidyl acrylate, glycidyl methacrylate and amino (meth)acrylates such as 2-aminoethyl (meth) acrylate.

Other possible monomers include crosslinking monomers. Particularly suitable are monomers containing uv-crosslinkable groups, eg a monomer containing a benzophenone group.

The synthesis of the copolymer is carried out in a preferred embodiment by emulsion polymerization; it is therefore an emulsion polymer.

Alternatively however, preparation can be effected by, say, solvent polymerization followed by dispersion in water.

In emulsion polymerization, ionic and/or non-ionic emulsifiers and/or protective colloids or stabilizing agents are used as surface-active compounds.

A detailed description of suitable protective colloids is given in Houben-Weyl, Methoden der organischen Chemie, Vol. XIV/1, "Macromolecular Materials", Georg-Thieme-Verlag, Stuttgart, 1961, pp 411 to 420. Suitable emulsifiers are anionic, cationic and non-ionic emulsifiers. Preferably supplementary surfactants used are exclusively emulsifiers, whose molecular weight, unlike the protective colloids, is usually below 2000 g/mol. Of course, when use is made of mixtures of surfactants, the constituents have to be compatible to each other, which can be checked if necessary by a few preliminary tests. Preferably anionic and non-ionic emulsifiers are used as surfactants. Commonly used supplementary emulsifiers are for example ethoxylated fatty alcohols (comprising $C_8$–$C_{36}$ alkyl; degree of ethoxylation: 3 to 50), ethoxylated mono-, di- and tri- ($C_4$–$C_9$ alkyl)phenols (degree of ethoxylation: 3 to 50), alkali metal salts of dialkyl esters of sulfosuccinic acid and also alkali metal and ammonium salts of ($C_8$–$C_{12}$ alkyl) sulfates, of ethoxylated $C_{12}$–$C_{18}$ alkanols (degree of ethoxylation: 4 to 30), of ethoxylated ($C_4$–$C_9$ alkyl)phenols (degree of ethoxylation: 3 to 50), of ($C_{12}$–$C_{18}$ alkyl)sulphonic acids and of ($C_9$–$C_{18}$ alkyl) arylsulfonic acids.

Other suitable emulsifiers are compounds of general formula II

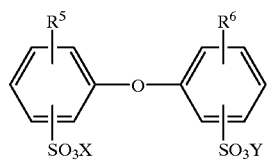

(II)

in which $R^5$ and $R^6$ denote hydrogen or $C_4$–$C_{14}$ alkyl but are not both hydrogen, and C and Y can be alkali metal ions and/or ammonium ions. Preferably $R^5$, $R^6$ denote linear or branched alkyl groups containing from 6 to 18 carbons or hydrogen and particularly containing 6, 12 and 16 carbons, whilst $R^5$ and $R^6$ are not both hydrogen. X and Y are preferably sodium, potassium or ammonium ions, sodium being particularly preferred. Compounds II in which X and Y denote sodium, $R^5$ denotes a branched alkyl group containing 12 carbons and $R^6$ is hydrogen or $R^5$ are particularly advantageous. Frequently industrial mixtures are used containing a portion of from 50 to 90 wt % of the monoalkylated product, for example Dowfax® 2A1 (trademark of Dow Chemical Company).

Suitable emulsifiers are also given in Houben-Weyl, Methoden der organischen Chemie, Vol. 14/1, "Macromolecular Materials", Georg Thieme Verlag, Stuttgart, 1961, pages 192 to 208.

Trade Names of emulsifiers are eg Dowfax®2 A1, Emulan® NP 50, Dextrol® OC 50, emulsifier 825, emulsifier 825 S, Emulan® OG, Texapol® NSO, Nekanil® 904 S, Lumiten® I-RA, Lumiten E 3065, Disponil FES 77, Lutensol AT 18, Steinapol VSL, Emulphor NPS 25.

The surfactant is usually employed in amounts of from 0.1 to 10 wt %, based on the monomers to be polymerized.

Water-soluble initiators for emulsion polymerization are eg ammonium and alkali metal salts of peroxydisulfuric acid, eg sodium peroxodisulphate, hydrogen peroxide or organic peroxides, eg tert-butyl hydroperoxide.

Particularly suitable are redox initiator systems.

Redox initiator systems are made up of at least one, usually inorganic, reducing agent and one inorganic or organic oxidizing agent.

The oxidizing component is for example one of the aforementioned initiators for the emulsion polymerization.

The reducing components are for example alkali metal salts of sulfurous acid, such as sodium sulfite, sodium hydrogensulfite, alkali metal salts of pyrosulfurous acid such as sodium disulfite, bisulfite addition compounds of aliphatic aldehydes and ketones, such as acetone bisulfite or reducing agents such as hydroxymethanesulfinic acid and the salts thereof, or ascorbic acid. The redox initiator systems can be used together with soluble metal compounds whose metallic component can exist in more than one valence state.

Common redox initiator systems are eg ascorbic acid/iron (II) sulfate/sodium peroxodisulfate, tert-butylhydroperoxide/sodium disulfite, tert-butyl hydroperoxide/sodium hydroxymethane sulfinic acid. The individual components, eg the reducing component, may be mixtures, eg a mixture of the sodium salt of hydroxymethanesulfinic acid and sodium disulfite.

The said compounds are mostly used in the form of aqueous solutions, the lower concentration limit being determined by the amount of water acceptable in the dispersion and the upper concentration limit by the solubility of the respective compound in water. Generally, the concentration is from 0.1 to 30 wt %, preferably from 0.5 to 20 wt % and more preferably from 1.0 to 10 wt %, based on the solution.

The amount of initiators is generally from 0.1 to 10 wt % and preferably from 0.5 to 5 wt %, based on the monomers to be polymerized. Alternatively, a number of different initiators can be used for the emulsion polymerization.

During polymerization, regulators can be used, eg in amounts of from 0 to 0.8 parts by weight, based on 100 parts by weight of the monomers to be polymerized, by means of which the molar mass is reduced. Suitable compounds are for example those having a thiol group such as tert-butyl mercaptan, thioglycolic acid ethyl acrylate, mercaptoethynol, mercaptopropyl trimethoxysilane or tert-dodecyl mercaptan. The portion of these regulators, when used as adhesive for film lamination, is preferably from 0.05 to 0.8 parts by weight and more preferably from 0.1 to 0.5 parts by weight, based on 100 parts by weight of the monomers to be polymerized. When the product is used as adhesive for lamination of glossy film, the use of a modifier is less preferred. The regulators contain no polymerizable, ethylenically unsaturated groups. The regulators stop the polymerizing chain and are therefore attached to the ends of the polymer chains.

Emulsion polymerization is usually carried out at from 30° to 130° C. and preferably from 50° to 90° C. The polymerization medium can consist either of water only or of mixtures of water and water-miscible liquids such as methanol. Preferably only water is used. The emulsion polymerization can be carried out either as a batch process or in the form of an inflow process, including stepwise or gradient processing. Preference is given to the in-flow process, in which a portion of the polymerization recipe is placed in the reactor, heated to the polymerization temperature and incipiently polymerized, after which the rest of the polymerization recipe is fed to the polymerization zone, usually via a number of discrete feed streams, of which one or more contains the monomers in a pure or emulsified form, continuously, stepwise or with superimposed concentration gradient, whilst maintaining polymerization. The particle size achieved during polymerization may be more finely adjusted by the use of a polymer seed in the initial batch.

The manner in which initiator is fed to the polymerization vessel during the course of free-radical aqueous emulsion polymerization is known to the person possessing average skill in the art. It can either be placed as entire batch in the polymerization vessel, or it can be fed in during the free-radical aqueous emulsion polymerization at the rate at which it is consumed, continuously or stepwise. Specifically, this depends on the chemical nature of the initiator system and on the polymerization temperature. Preferably a portion is used in the initial batch while the rest is fed to the polymerization zone at the rate at which it is consumed.

In order to remove residual monomers, initiator is usually also added on completion of the actual emulsion polymerization, ie after a conversion of the monomers of at least 95% has been achieved.

The individual components can be fed to the reactor during the inflow process downwardly, from the side, or upwardly through the base of the reactor.

The emulsion polymerization produces aqueous dispersions of the polymer usually having a solids content of from 15 to 75 wt %, preferably from 40 to 75 wt %.

The pH is preferably adjusted to a value of less than 7.5, ie to an acid or weakly acid value.

In order to attain a high space-time yield of the reactor, dispersions having maximum solids contents are preferred. In order to achieve solids contents >60 wt %, the particle size should be bimodal or polymodal, as otherwise the viscosity is too high and the dispersion is no longer easy to handle. The production of a new particle generation can be achieved for example by the addition of seed (EP 81083), by the addition of an excess amount of emulsifying agent or by the addition of mini-emulsions. Another advantage gained by low viscosity and high solids is an improvement in the coating properties at high solids contents. The production of one or more new particle generations can take place at any time. It is governed by the particle-size distribution required to give a low viscosity.

The copolymer thus prepared is preferably used in the form of its aqueous dispersion.

Another preferred embodiment for the preparation of the copolymer comprises solvent polymerization in an organic solvent. The solvent is then preferably removed. The substantially solventless copolymer can then be preferentially used as a hot-melt adhesive.

Preferably copolymers used as hot-melt adhesive are uv-crosslinkable copolymers. The copolymers preferably contain corresponding uv-crosslinkable monomers (see above). The content of these monomers is, in particular, from 0.01 to 10 wt % and preferably from 0.05 to 5 wt %, based on the copolymer.

Preferably the copolymers are synthesized by polymerization of the monomers in solvents having a boiling range of from 50° to 150° C., preferably of from 60° to 120° C., with the use of conventional amounts of polymerization initiators, these amounts being generally from 0.01 to 10, particularly from 0.1 to 4 wt %, based on the total weight of the monomers. Particularly suitable solvents are alcohols, such as methanol, ethanol, n-propanol and isopropanol, n-buatanol and isobutanol, preferably isopropanol and/or isobutyl alcohol and also hydrocarbons such as toluene and particularly gasolenes having a boiling range of from 60° to 120° C. Furthermore, ketones, such as acetone and methyl ethyl ketone, and esters, such as ethyl acetate, and also mixtures of such solvents may be used, whilst mixtures containing isopropanol and/or isobutyl alcohol in amounts of from 5 to 95 wt %, preferably from 10 to 80 wt % and more preferably from 25 to 60 wt %, based on the solvent mixture used, are preferred.

Suitable polymerization initiators for the solvent polymerization are for example azo compounds or ketone peroxides.

Following polymerization in solution, the solvents may be optionally separated under reduced pressure at an elevated temperature, for example a temperature in the range of from 100° to 150° C. The polymers can then be used in a solvenltless state, ie as a melt. In some cases it may be of advantage to prepare the uv-crosslinkable polymers by bulk polymerization, ie without the supplementary use of a solvent, this being carried out batchwise or continuously, for example as described in U.S. Pat. No. 4,042,768.

The resulting copolymers are preferably used as a melt, ie substantially free from solvent (solvent content preferably less than 2 wt % based on the polymer), to act as a hot-melt adhesive.

The glass transition temperature of the copolymer is, irrespective of its manufacturing process, preferably below 30° C., more preferably from −60° to +20° C., very preferably -from 50° to 0° C. and most preferably from −50° to −10° C.

The glass transition temperature can be determined by conventional methods such as differential thermal analysis or differential Scanning Calorimetry (cf eg ASTM 3418/82, "midpoint temperature").

The copolymer has, irrespective of its method of manufacture, preferably a peel strength (as a measure of its adhesive power) of from 0.5 to 10 and more preferably of from 1 to 5 newton/25 mm. In the case of crosslinkable copolymers, eg uv-crosslinkable copolymers, the above value is that obtained following crosslinking.

The above value of the peel strength is determined as follows.

The copolymer is applied to a polyethylene film. The rate of application is 20 g per m$^2$ of film.

Following drying, if necessary, and optionally following uv crosslinking, a 25 mm wide tape of the coated film is stuck to high-grade steel. The contact pressure is 2.5 kg (applied by roller).

The force required to peel off the tape is then determined at 21° C. in a tension tester as specified in ASTM1.

The copolymer is used as binding agent in the adhesive.

The adhesive may comprise the copolymer only or an aqueous dispersion of the copolymer.

The adhesive may contain further additives, eg wetting agents, thickeners, stabilizing agents, light-stabilizing agents and biocides.

In particular, it is am aqueous adhesive or a hot-melt adhesive.

The protective film of the invention is preferably a thermoplastic film coated on one side with the adhesive. These may be any suitable polymer films, such as films of polyolefins, eg polyethylene, polypropylene and polyolefin copolymers and films of polyesters or polyacetate.

Alternatrively, the film may be a compound film composed of various polymer films.

If desired, an adhesion promoter can be applied to the surface of the film in order to improve the adherence of the adhesive layer.

The labels of the invention can be labels of paper or preferably of thermoplastic film. Suitable thermoplastic films are the above-mentioned polymer films. The labels are coated on one side with adhesive.

The adhesive can be applied to the protective films or labels by conventional methods such as knife coating and brush coating.

The rate of application is preferably from 0.1 to 20 g and more preferably from 2 to 15 g of copolymer per $m^2$.

Application is optionally followed by a drying step for the removal of water. In the case of uv-crosslinkable copolymers, uv crosslinking is carried out after said application.

The adherence of the adhesive layer on the protective films or labels is very good.

The protective film is suitable for the protection of objects, particularly during transport and storage thereof.

The objects to he protected may be eg objects of metal, wood, glass or plastics material.

As examples thereof there may be mentioned motor vehicle bodies or parts of motor vehicle bodies, varnished surfaces and transparent surfaces.

The labels are particularly suitable for the surfaces of, say, packages, books etc.

The protective films and labels can be peeled off without leaving a residue of adhesive on the objects. The adherence on the objects is good, despite the fact that the protective films and labels can be readily peeled off.

EXAMPLES

I. Preparation of Polymer Dispersions

1. Preparation of a Dispersion Containing 2% of UMA

| | Initial batch (g) | Monomer emulsion (g) | Initiator (g) | Post-catalysis (g) |
|---|---|---|---|---|
| water | 260 | 303 | | |
| polymer seed (33% strength in water) | 3.25 | | | |
| emulsifier solution 1 | | 14.3 | | |
| emulsifier solution 2 | | 4.8 | | |
| 2-EHA | | 214.5 | | |
| n-BA | | 436.1 | | |
| UMA | | 14.3 | | |
| MMA | | 42.9 | | |
| AA | | 7.15 | | |
| NaPS 2.5% strength solution in water | | | 57.2 | |
| t-BHP 10% strength solution in water | | | | 21.4 |
| Rongalit C 18% strength solution in water | | | | 10.7 |

Emulsifier Solution 1

A 30 wt % strength solution of the sodium salt of a mixture of sulfuric half esters of $C_{10}$–$C_{16}$ alkyl ethoxylates (average degree of ethoxylation 30) in water (Disponil FES 77 sold by Henkel KgaG)

Emulsifier Solution 2

A 45 wt % strength solution of the sodium salt of (dodecylsulfonylphenoxy)benzenesulfonic acid (Dowfax 2A1 sold by Dow Chemical)

MMA: methyl methacrylate

2-EHA: 2-ethylhexyl acrylate n-BA: n-butyl acrylate

AA: acrylic acid

UMA: ureidomethacrylate as 25% strength solution in the stated amount of MMA

NaPS: sodium peroxodisulfate t-BHP: tert-butyl hydroperoxide

Mode of Operation

The initial batch was placed in a 2 liter flask equipped with reflux condenser, nitrogen inlet and metal stirrer. The temperature was raised to 90° C. while purging with nitrogen. 20% of the initiator solution was added over a period of 2 minutes. After 5 minutes, the monomer emulsion was added over a period of 3 hours. At the same time the remaining initiator solution was added over a period of 3.5 hours. On completion of the initiator feed, polymerization was continued for a further 30 minutes. The mixture was then cooled to 80° C. and the post-catalysis solution and ammonia added.

2. Dispersion without UMA (for Comparison)

Example 1 was repeated except that UMA was replaced by VMA.

3. Dispersion Containing 1% of UMA

Example 1 was repeated except for the following changes:

| | |
|---|---|
| UMA: | 7.15 g |
| MMA: | 21.45 g |
| n-BA: | 464.75 g |

4. Dispersion Containing 3% of UMA

Example 1 was repeated except for the following changes:

| | |
|---|---|
| UMA: | 21.45 g |
| MMA: | 64.35 g |
| n-BA: | 407.55 g |

II. Preparation of the Protective Films and Performance Tests

The dispersion was knife-coated onto a polyethylene film (corona pretreated polyethylene) at a rate of from 5 to 6 $g/m^2$ and dried at 90° C. for three minutes, Test for Residue-free Peeling This test consists in the evaluation of the appearance of the surface to be protected following peeling of the protective film. The surface to which the film is stuck is stored at 50° C. and 80% relative humidity over periods of one week and four weeks. The films are then peeled off by hand once slowly and once rapidly and the residue on the substrate surface is judged by visual assessment. Ideally) the surface is free from residues of adhesive, The following scale is used for the evaluation:

1. substrate surface unchanged
2. contours of the protective film noticeable on the surface
3. impression of the film discernable as a shadow
4. some residue of adhesive on the surface
5. portions of the adhesive layer transferred to the surface
6. adhesive layer completely transferred to the surface Peeling is judged according to the following scale:

A. almost no adherence

B. slightly peelable

C. peelable with difficulty

Testing Was Carried Out on Steel, Polycarbonate and Plexiglass

| Dispersion | With-drawal | Plexiglass 1 weeks | Plexiglass 4 weeks | Polycarbonate 1 weeks | Polycarbonate 4 weeks | Steel 1 weeks | Steel 4 weeks |
|---|---|---|---|---|---|---|---|
| dispersion without UMA | slow | B6 | B6 | B6 | B6 | B6 | B6 |
|  | fast | B6 | B6 | B6 | B6 | B6 | B6 |
| dispersion containing 1% of UMA | slow | B1 | B1 | B4 | B4 | B4 | B4 |
|  | fast | B1 | B1 | B4 | B4 | B4 | B4 |
| dispersion containing 2% of UMA | slow | B1 | B1 | B4 | B4 | B1 | B4 |
|  | fast | B1 | B1 | B1 | B1 | B4 | B4 |
| dispersion containing 3% of UMA | slow | B1 | B1 | B1 | B1 | B2 | B2 |
|  | fast | B1 | B1 | B1 | B1 | B4 | B2 |
| Acronal ® 50 D | slow | C4 | C4 | C6 | C6 | C5 | C5 |
|  | fast | C1 | C4 | C6 | C6 | C6 | C6 |
| Acronal ® 50 D containing 1.5% of Basonal ® FDS 3425) | slow | B1 | B1 | C1 | B1 | C3 | B3 |
|  | fast | B1 | B1 | C1 | B1 | C3 | B3 |

Acronal® 50 D is a commercial crude adhesive based on dispersions sold by BASF for use on protective films. Acronal® 50 D is formulated with isocyanate crosslinker, in order to guarantee residue-free peeling of the protective film from the substrate.

Quick-stick strengths peel strength and scraping strength on polyethylene film:

The dispersions were knife-coated onto 25 mm wide pieces of polyethylene film at a rate of 20 g/m² and dried at 90° C. over a period of 3 minutes.

The resulting protective films were stuck to a steel plate and the quick-stick strength and peel strength were tested at 23° C. and 50% relative humidity.

After storage for 24 h, the peel strength was determined in a tension tester having a take-up speed of 300 mm/min.

Scraping test:
1. no scrape-off possible
2. difficult to scrape off
3. easy to scrape off The adherence of the dispersion on the film is tested using the scraping test: the more difficult it is to scrape of the film, the better the adherence of the dispersion, Mark 1 is the optimum.

Quick-stick Test

To determine the quick-stick strength, a 17.5 cm long and 2.5 cm wide test strip was clamped at both ends in the jaws of a tensile testing machine to form a loop, which was then brought into contact with a chromium-plated steel surface at the rate of 30 cm/min (lowering of the loop onto the chromium-plated sheet steel). After all-over contact had been achieved, the loop was immediately withdrawn and the maximum force in N/2.5 cm occurring during this operation was determined as a measure of the quick-stick strength (loop strength, tack).

Results

| Dispersion | Quick-stick strength N/25 mm | Peel strength in N/25 mm after storage for 24 h | Scraping test |
|---|---|---|---|
| dispersion without UMA | 5.5 | 6.4 | 2 |
| dispersion containing 1% of UMA | 2.6 | 2.6 | 1 |
| dispersion containing 2% of UMA | 2.9 | 3.5 | 1 |
| dispersion containing 3% of UMA | 3.7 | 4.5 | 1 |
| Acronal ® 50 D | 6.5 | 7.2 | 3 |
| Acronal ® 50 D containing 1.5% of isocyanate (Basonal ® FDS 3425) | 3.7 | 2.5 | 1 |

What is claimed is:

1. An adhesive-coated protective film or label, which is peelable without leaving a residue, wherein the adhesive contains a copolymer that is capable of undergoing free-radical polymerization and which comprises from 2 wt % to 10 wt %, based on the copolymer, a compound A containing at least one copolymerizable, ethylenically unsaturated group and a group of formula I

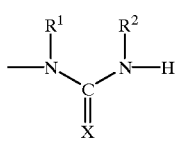

(I)

in which $R^1$ and $R^2$ independently stand for hydrogen or $C_1$–$C_5$ alkyl or $R^1$ and $R^2$ together form a bridging $C_2$–$C_4$ alkylene group, which can be mono- or di-substituted by a $C_1$–$C_4$ alkoxy group or hydroxyl group, and X stands for O or S, wherein the copolymer has a peel strength of from 1 to 5 newton, when it is applied at rate of 20 g of copolymer per 1 m² of polyethylene film and a 25 mm wide tape of the coated polyethylene film is stuck to steel under a contact pressure of 2.5 kg and the tape is peeled at 21° C.

2. A protective film or a label as defined in claim 1, wherein the ethylenically unsaturated group in compound A is a (meth)acrylic group.

3. The adhesive-coated protective film or label as defined in claim 1, wherein compound A is a compound of formula II

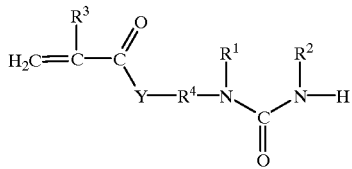

in which $R^3$ stands for hydrogen or methyl group, Y for —O— or —NH— and $R^4$ for a $C_1$–$C_{10}$ alkylene group.

4. The adhesive-coated protective film or label as defined in claim 1, wherein the copolymer further comprises at least 40 wt % monomers selected from the group consisting of $C_1$–$C_{10}$ alkyl (meth)acrylates, vinyl esters of carboxylic acids containing up to 20 carbon atoms, vinyl aromatic compounds containing up to 20 carbon atoms, ethylenically unsaturated nitriles, vinyl halides, vinyl ethers of alcohols containing from 1 to 10 carbons, aliphatic hydrocarbons containing from 2 to 8 carbons and one or two double bonds, and mixtures of these monomers.

5. The adhesive-coated protective film or label as defined in claim 1, wherein the copolymer is an emulsion copolymer.

6. The adhesive-coated protective film or label as defined in claim 1, wherein the adhesive is a hot-melt adhesive and the copolymer is prepared by solvent polymerization in an organic solvent.

7. The adhesive-coated protective film as defined in claim 1, which is a thermoplastic film.

8. The thermoplastic film as defined in claim 7, wherein the thermoplastic film is a polyethylene film.

9. A method of labeling an object comprising applying the adhesive-coated label of claim 1 to said object.

10. A method of protecting an object comprising applying the adhesive-coated protective film of claim 1 to said object.

* * * * *